US010166741B2

(12) United States Patent
Ying et al.

(10) Patent No.: US 10,166,741 B2
(45) Date of Patent: Jan. 1, 2019

(54) SILICON STEEL COMPOSITE FOR LOW DENOMINATION COIN

(71) Applicant: The United States of America, as Represented by the Secretary of Treasury, Washington, DC (US)

(72) Inventors: Tsineng Tony Ying, Gaithersburg, MD (US); Richard R. Robidoux, Washington, DC (US)

(73) Assignee: THE UNITED STATES OF AMERICA, AS REPRESENTED BY THE SECRETARY OF THE TREASURY, Washington, DC (US)

( * ) Notice: Subject to any disclaimer, the term of this patent is extended or adjusted under 35 U.S.C. 154(b) by 0 days.

(21) Appl. No.: 15/661,141

(22) Filed: Jul. 27, 2017

(65) Prior Publication Data

US 2018/0154611 A1    Jun. 7, 2018

Related U.S. Application Data

(60) Provisional application No. 62/430,136, filed on Dec. 5, 2016.

(51) Int. Cl.
*B32B 15/01*    (2006.01)
*C22C 38/04*    (2006.01)
(Continued)

(52) U.S. Cl.
CPC .......... *B32B 15/015* (2013.01); *B32B 15/013* (2013.01); *B32B 15/04* (2013.01); *B32B 15/043* (2013.01); *C21D 6/005* (2013.01); *C21D 6/008* (2013.01); *C22C 38/002* (2013.01); *C22C 38/02* (2013.01); *C22C 38/04* (2013.01); *C22C 38/06* (2013.01); *C23C 18/32* (2013.01); *C23C 30/00* (2013.01); *C23C 30/005* (2013.01); *B32B 2255/06* (2013.01); *B32B 2255/205* (2013.01); *C22C 2202/02* (2013.01); *Y10T 428/1291* (2015.01); *Y10T 428/12882* (2015.01);
(Continued)

(58) Field of Classification Search
CPC ........... B32B 15/015; B32B 2255/205; B32B 15/013; B32B 15/04; B32B 15/043; B32B 15/18; B32B 15/20; B32B 2255/06; C22C 38/04; C22C 38/02; C22C 38/002; C22C 38/06; C22C 2202/02; C21D 6/005; C21D 6/008; C23C 18/32; C23C 18/38; C23C 18/31; C23C 18/50; C23C 18/54; C23C 30/00; C23C 30/005; Y10T 428/12882; Y10T 428/12903; Y10T 428/1291; Y10T 428/12917; Y10T 428/12924; Y10T 428/12931; Y10T 428/12937; Y10T 428/12972; Y10T 428/12979; Y10T 428/12993; Y10T 428/24942; Y10T 428/26

See application file for complete search history.

(56) References Cited

U.S. PATENT DOCUMENTS 2,209,685 A     7/1940  Crafts
5,200,145 A     4/1993  Krutenat et al.
2005/0266240 A1*  12/2005  Kim ...................... H01B 5/104
                                                                428/364

* cited by examiner

*Primary Examiner* — Michael E. La Villa
(74) *Attorney, Agent, or Firm* — Office of Chief Counsel for National Institute of Standards and Technology

(57) ABSTRACT

An alloy includes: steel; manganese; aluminum; and silicon in an amount such that the alloy has an electrical conductivity from 2% IACS to 6% IACS measured in accordance with ASTM E1004-09 (2009).

14 Claims, 8 Drawing Sheets

(51) Int. Cl.
  *C22C 38/02* (2006.01)
  *C22C 38/00* (2006.01)
  *C22C 38/06* (2006.01)
  *C21D 6/00* (2006.01)
  *C23C 18/32* (2006.01)
  *B32B 15/04* (2006.01)
  *C23C 30/00* (2006.01)
(52) U.S. Cl.
  CPC .................. *Y10T 428/12903* (2015.01); *Y10T 428/12917* (2015.01); *Y10T 428/12924* (2015.01); *Y10T 428/12931* (2015.01); *Y10T 428/12937* (2015.01); *Y10T 428/12972* (2015.01); *Y10T 428/12979* (2015.01); *Y10T 428/12993* (2015.01); *Y10T 428/24942* (2015.01); *Y10T 428/26* (2015.01)

SILICON STEEL COMPOSITE FOR LOW DENOMINATION COIN

CROSS REFERENCE TO RELATED APPLICATIONS

This application claims the benefit of U.S. Provisional Patent Application Ser. No. 62/430,136, filed Dec. 5, 2016, the disclosure of which is incorporated herein by reference in its entirety.

STATEMENT REGARDING FEDERALLY SPONSORED RESEARCH

This invention was made with United States Government support from the United States Mint, an agency of the United States Department of the Treasury. The Government has certain rights in the invention.

BRIEF DESCRIPTION

Disclosed is an alloy comprising: steel; manganese; aluminum; and silicon in an amount such that the alloy has an electrical conductivity from 2% International Annealed Copper Standard (IACS) to 6% IACS measured in accordance with ASTM E1004-09 (2009).

Also disclosed is a composite comprising: an alloy core comprising the alloy; and a plating disposed on the alloy core and comprising nickel.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
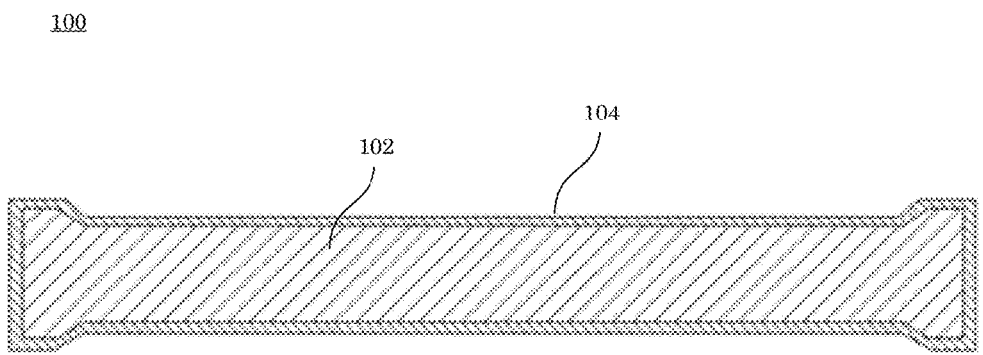
FIG. 1 shows a coin that includes a composite.

A detailed description of one or more embodiments is presented herein by way of exemplification and not limitation.

Nickel plated low carbon steel is widely used as a low denomination coinage material. Although governments receive a cost benefit by making coins made of the nickel plated low carbon steel, fraud issues deter use of nickel plated low-carb and still in higher denomination coins because the low carbon steel occurs nearly worldwide. Conventional low carbon steels have the same electromagnetic signal (EMS) that is used to distinguish the legitimate coins from fraudulent slugs in most coin validators. Electrical steel is made with larger additions of silicon (typically 1% to 6%) in iron alloy, so-called silicon steel. It has been discovered that, by varying silicon concentration, a conductivity, permeability, and hysteresis of an alloy herein is changed. Silicon steel is used in the electric industry to make transformers, electric motors, relays, and the like. It has further been discovered that, if the silicon concentration is set at a special value, the EMS will be unique and different to that of low carbon steel. As a result, nickel-plated electrical steel provides low cost to make coins. Advantageously, coin fraud issues associated with plated carbon steels is significantly reduced.

Further, it has been discovered that the alloy herein has unexpected and beneficial electrical, chemical, and physical properties suitable as a substitute for a cupronickel alloy for coins used in commerce, particularly coins in the United States that include the cupronickel alloy.

Materials used in a manufacture of the alloy can contain a low level of an impurity such as a metal-, carbon-, or nitrogen-containing impurity. Such impurity can be present in the alloy described herein, provided that the impurity is not present in an amount that significantly adversely affects the desired properties of the alloy, in particular the electrical conductivity of the alloy. Impurities can be present in the alloy in a minor amount due to, e.g., leaching from contact with manufacturing equipment, uptake during processing of the alloy, or components in an alloying composition that is used to make the alloy.

In an embodiment, the alloy includes silicon and a plurality of transition metal elements that can include, e.g., iron, manganese, aluminum, or the like. The alloy has a property effective for use of the alloy in currency, e.g., as a coin. In a particular embodiment, the alloy includes silicon, iron, manganese, and aluminum in amount effective such that the alloy has an electrical conductivity compatible with disposition in a coin that is compatible with a coin vending apparatus, a coin counter, or a coin identification machine.

In the alloy, the silicon can be present in an amount from 0.01 wt. % to 6.0 wt. %, specifically from 0.2 wt. % to 3.0 wt. %, and more specifically from 0.4 wt. % to 1.6 wt. %, based on a total weight of the alloy.

In the alloy, the manganese can be present in an amount from 0.01 wt. % to 0.3 wt. %, specifically from 0.03 wt. % to 0.2 wt. %, and more specifically from 0.07 wt. % to 0.15 wt. %, based on a total weight of the alloy.

The alloy can contain other elements such as Fe, Pb, P, or S, in an amount from 0 wt. % to 1.0 wt. %, specifically less than or equal to 0.5 wt. %, based on a total weight of the alloy.

The alloy can include carbon that is present in an amount from 0.001 wt. % to 0.1 wt. %, specifically from 0.001 wt. % to 0.05 wt. %, and more specifically from 0.001 wt. % to 0.02 wt. %, based on a total weight of the alloy.

In an embodiment, the alloy includes carbon present in an amount from 13 wt. % to 16 wt. %, based on a total weight of the alloy. It is contemplated that the alloy includes steel present in an amount as a balance of the total weight of the alloy.

The alloy can contain less than 1 weight percent (wt. %), less than 0.5 wt. %, or less than 0.1 wt. % of materials (e.g., the impurity) other than the silicon, manganese, and aluminum, based on the total weight of the alloy, wherein a lower bound is 0 wt. % of the impurity.

The alloy can be used in a composite. In an embodiment, with reference to FIG. 1, composite 100 includes: alloy core 102 including the alloy; and plating 104 disposed on alloy core 102 and including nickel. In some embodiments, the plating is completely disposed on the alloy core such that the alloy core is not exposed and is not visible through the plating. In some embodiments, plating is partially disposed in the long core such that the alloy core is exposed in visible through the plating.

The plating can include cupronickel, wherein the cupronickel includes the nickel. It is contemplated that an atomic ratio of copper to nickel in the cupronickel is 75:25.

In an embodiment, an alloy includes: steel, silicon, manganese, and aluminum, wherein the alloy is rolled into a sheet for planchets and coins. The alloy can further include a nickel plating applied over the alloy as shown in FIG. 1. The alloy can further include a cupronickel (75/25) plating applied over the alloy. An appearance of the composite can be made to be identical to coins for use in commerce. Coins can include, e.g., a penny, nickel, and time: dollar, souvenir coin, and the like.

In an embodiment, the alloy includes: from 0.2 wt. % to 3.6 wt. % silicon, 0.5 wt. % manganese, from 0.2 wt. % to 0.8 wt. % aluminum, from 0 wt. % to 0.05 wt. % carbon, and a balance of steel, based on the total weight of the alloy In an embodiment, the alloy includes: steel and silicon and has an IACS conductivity from 2.0% IACS to 11.0% IACS as measured by a four-points conductivity meter based on concentration of the silicon from 0.01% to 6%. It is contemplated that the conductivity of the silicon steel is measured by four-points conductivity meter.

The alloy or composite thereof can have a relative permeability from 4,000 to 40,000, and specifically from 4,000 to 10,000, based on a different concentration of the silicon.

The alloy or composite thereof can have a different lag phase when an eddy current sensor applied on a surface of the alloy is compared to a non-ferrous metal. The difference in lag phase can be from 0 to 60, specifically from 0 to 30.

When an eddy current sensor is used to measure the alloy, the impedance provides the conductivity of the alloy changes and also the lag angle. On a Scancoin machine, the digital reading for the impedance circuit can change from 65 to 25. An equivalent conductivity of the alloy or composite thereof can be as low as 1 to 2% IACS.

The alloy or composite thereof can have a change in conductivity, permeability, hysteresis, or a combination thereof in response to subjecting a surface of the alloy or composite thereof to a plastic deformation.

The alloy or composite thereof can have a change in conductivity, permeability, hysteresis, or a combination thereof in response to a heat treating the alloy or composite thereof.

The alloy or composite thereof can have a change in conductivity, permeability, hysteresis, or a combination thereof in response to subjecting the alloy or composite thereof to full anneal process.

It is contemplated that the alloy or composite thereof herein can be used in making coins with nickel or cupronickel-plated alloy for reducing the material cost and increasing the security of such coins during circulation.

Because a price of metal (e.g., a non-ferrous metal) increases, the cost of the metal may be higher than a face value of a coin for low denomination coins. Therefore, certain countries use nickel-plated low carbon steel as coinage material to save on metal cost. Because of the inert properties of nickel, wear and corrosion resistance of nickel-plated steel coins are better than many copper alloys. Although the cost for manufacturing nickel-plated steel coins is low and corrosion and wear resistance is high, coin fraud increases with higher denomination values. Because low carbon steel is a very common material that can be found anywhere and the nickel plating process is simple, it is very easy to make fraudulent coins. Further, for most coin validators, eddy current sensors are used to sort metal coins from slugs. Images on the coin surface do not change impedance of eddy current sensors. Planchets can generate the same digital readings from a coin validator as the coins made of that material. Thus, coins made of nickel-plated steel pose fraud challenges, and a metal film coated on a low carbon steel slug can pass as a legitimate nickel plated low carbon steel coin.

Advantageously and unexpectedly, particularly for making coins used in commerce, the alloy or composite thereof has a conductivity, permeability and hysteresis that are different from the low carbon steel. Further the conductivity, permeability and hysteresis are changed after a blank of the alloy or composite thereof are stamped under a cold deformation condition into a coin because the plastic deformation subjected to a surface of the blank. These changes make digital readings of 20 from an eddy current sensor of the stamped coin different from than un-deformed planchets of the alloy or composite thereof. Counterfeiting of coins that include the alloy or composite thereof is lower than for coins made of low carbon steel.

A device (also referred to herein as a coin validator) to verify an authenticity of a coin detect non-ferrous materials. Conductivities of coinage materials are detected by inductive sensors as an eddy current. When alternating current passes through an inductive coil that is disposed on a surface of a metal, an alternating magnetic field is produced below the surface of the metal. The magnetic field produces an eddy current that is in the opposite direction in the inductive sensor. The lower the resistivity of the metal, the higher the current is generated. The opposing current in the metal further produces an opposite magnetic field against to the initial magnet filed in the eddy current sensor. Thus, the impedance of the sensor in the circuit is a function of the resistivity in the material. An analog value of the impedance in the circuit can be digitized. By analyzing the circuit impedance readings, the electrical resistivity of the material of the coin can is determined. The signals acquired with this method on metals are called electromagnetic signature (EMS). Aside from resistivity, which is the inverse of conductivity (i.e., 1/conductivity), a diameter or thickness of coins is measured with inductive sensors in some coin validators.

Furthermore, the eddy current generated in a metal is a function of frequency. A greater eddy current is generated in a thinner layer of the metal as a frequency increases in the sensor. Due to this relationship of eddy current and frequency, multiple frequencies are applied to a coin from sensors to distinguish resistivity near the surface or deep in the coin. Thus, the plating (which can be a cladding layer) disposed on the alloy core of a coin can be detected.

The eddy current generated in the detected metal can be calculated by the following equations. Eddy current density $J_x$ decreases with the depth.

$$J_x = J_o \exp(-x\sqrt{\pi f \mu \sigma}) \quad (1)$$

wherein $J_0$ is a constant; f is the frequency; $\mu$ is the permeability of the metal, and $\sigma$ is the conductivity of the metal. The total eddy current generated in the metal is determined from an integration of the current density with depth.

$$I_e = \int_0^{n\delta} J_o e^{\frac{-x}{\delta}} R dx = J_o R \int_0^{n\delta} e^{\frac{-x}{\delta}} dx = J_o R(-\delta) e^{\frac{-x}{\delta}} \Big|_0^{n\delta} \quad (2)$$

wherein R is constant; $\delta$ is the standard penetration depth $$\delta = \frac{1}{\sqrt{\pi f \mu \sigma}}, \quad (3)$$

and n is the number of standard penetration depth. When a number of standard penetration depth is larger than 3, the eddy current density approaches zero.

For a non-ferrous metal, $\mu$ is constant. Lag angle $\theta$ between current and voltage is a function of depth from a surface of the alloy or composite thereof, e.g., a coin.

$$\theta = \frac{x}{\delta} \quad (4)$$

The eddy current generated by the resistance of the alloy or composite thereof is lag angle $\theta$. Equation 2 is modified as follows.

$$I_{e-r} = \int_0^{n\delta} J_o e^{\frac{-x}{\delta}} \cos\left(\frac{x}{\delta}\right) R dx = \quad (5)$$

$$J_o R \int_0^{n\delta} e^{\frac{-x}{\delta}} \cos\left(\frac{x}{\delta}\right) dx = \frac{1}{2} J_o R(-\delta) e^{\frac{-x}{\delta}} \left(\sin\frac{x}{\delta} - \cos\frac{x}{\delta}\right) \Big|_0^{n\delta} =$$

$$-\frac{1}{2} J_o R \delta (e^{-n}(\sin(n) - \cos(n)) - e^0(\sin(0) - con(0))) =$$

$$-\frac{1}{2} J_o R \delta (e^{-n}(\sin(n) - \cos(n)) + 1)$$

For non-ferrous metals, the eddy current in the metal can be determined by integrating equation 5 because the permeability for non-ferrous metal is a constant.

Figure 2:
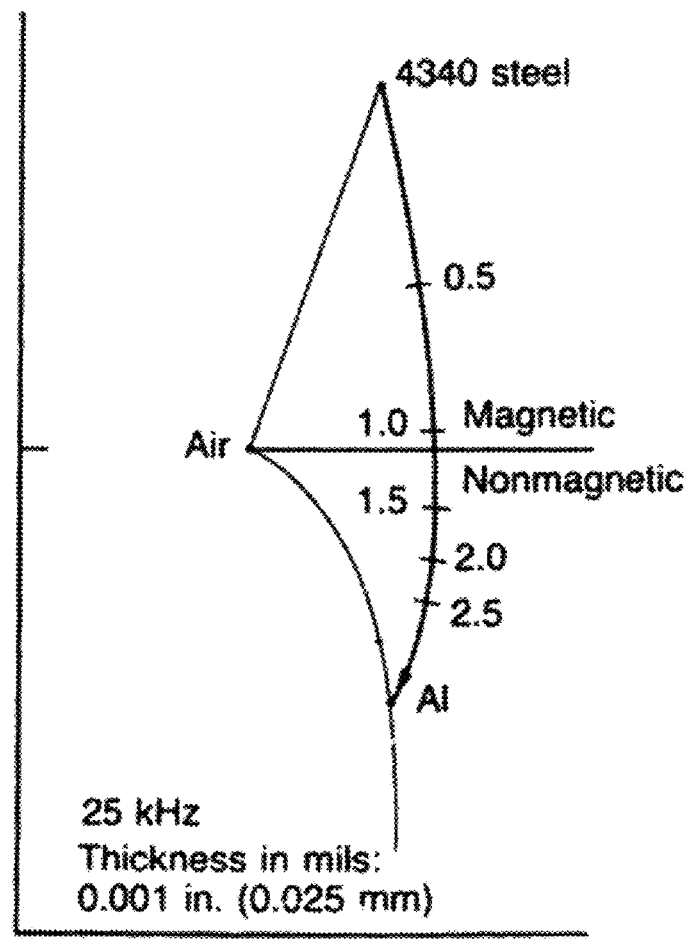
FIG. 2 shows a graph of current versus voltage.

For a ferrous material, such as low carbon steel, the permeability is larger than that for non-ferrous metals. Due to the high impedance of induction, the lag angle between current and the voltage increases as shown in FIG. 2. The circuit impedance for the eddy current sensor is not solely changed with conductivity, but also changes with permeability and the lag angle. For the resistant component, the lag phase between the current and the voltage also affects the EMS reading. The lag angle for all steels are different from non-ferrous metals as shown in FIG. 2. While the EMS digital readings from the analog circuit may have no physical meaning, the digital values reflect a of combination effects of the conductivity, permeability, and lag phase angle on the circuit. Although the EMS reading cannot be used to explain the material properties, the value is unique for a given material. Therefore, this unique EMS reading can be used to identify the coins from other slugs. For the ferrous material, the EMS from a coin validator is referred to herein as an equivalent conductivity.

For low carbon steels, the carbon concentration does not affect conductivity or permeability. Therefore, low carbon steels have the same EMS values from the same sensor so that coins made of nickel-plated low carbon steel have almost the same EMS from the same coin validator. For example, 5-cent Canadian coins made of multi-ply-plated low carbon steel has a similar EMS to the United Kingdom's 10 penny coins made of nickel-plated low carbon steel.

Furthermore, the equivalent conductivity of silicon steel is a function of plastic strain. For electrical applications, silicon steel sheets are punched to a desired shape. The plastic deformation formed at the cutting edge during the punch changes the magnetic and electric properties of the parts. During manufacturing, this plastic deformation is avoided by reducing the tolerance between the punch and the die. For coinage materials, e.g., non-ferrous materials and low carbon steel, the conductivity does not change with the plastic deformation. The EMS readings from planchets are the same as the coins stamped from them. To increase the security of circulating coins by decreasing production of counterfeit coins, for silicon steel coins, during stamping, the top surfaces of the planchets are plastically deformed. The plastic strain generated by stamping a coin is sufficient to change the magnetic and electric properties of the silicon steel. The EMS readings measured by an eddy current sensor is further reduced. The embossed image on a coin made of silicon steel can be detected by the same sensor for the EMS reading measurement to distinguish a coin from a planchet so no new sensor is needed.

The only disadvantage of silicon steel is its low corrosion resistance. In a high humidity environment, the steel surface will rust very fast. This drawback can be overcome by nickel plating (or application of other non-ferrous plating) on the surface as other low carbon steel coinage metals.

The conductivity, permeability and hysteresis of electrical steel are varied with the silicon concentration (unlike the relative constant values associated with low carbon steel). The variation can be detected by eddy current sensors used in coin validators. The measured EMS digital readings are distinct for given silicon concentration in the steel, although the readings have no specific physical meanings. The plastic strain generated in the stamping process further changes the conductivity and permeability which alters the EMS reading from those of the blanks or planchets. It will be appreciated that blanks are flat circular pieces punched from strips, and planchets are blanks with squeezed rim at their edges. These characteristics make the alloying composite thereof a low-cost but more secure coinage metal. Advantageously, the alloy and composite thereof provide secure coinage material at a low cost.

The alloy can be made in convention ways that are used to make silicon steel (also referred to as electrical steel). In an embodiment, a process for making the alloy includes melting, casting, hot rolling and cold rolling.

The composite can be made during melting. In an embodiment, a process for making the composite includes melting a small quantity of alloy; and hot or cold rolling with a test mill. The process is scalable. Once the silicon concentration is decided, the electric conductivity and permeability of the alloy is solely formed.

The alloy or composite thereof has numerous beneficial uses. The low conductivity and high permeability of the alloy generate a sole impedance when the alloy passes an eddy current sensor. This impedance separates the coins stamped with silicon steel to coins stamped with normal low carbon steel.

Moreover, the alloy or composite thereof has unexpected properties. For coin validators, embossed images on coins do not effect electrical digital readings with an eddy current sensor. For silicon steel, since the conductivity and permeability change with plastic strain during the stamping, conductivity and permeability are changed and also cause the impedance reading in an eddy current sensor circuit to change. With silicon steel, the impedance reading from a blank is reduced about 20 when it is stamped to a coin. This property enable an eddy coin validator to "find" embossed images.

The articles and processes herein are illustrated further by the following Example, which is non-limiting.

EXAMPLE

Five alloy samples with different silicon concentration were prepared. Compositions of the alloys are listed in Table 1. Strips of the alloy a was prepared with a gauge thickness that was 0.063". Blanks were punched from the strip of the alloy, wherein the blanks had a diameter that matched U.S. 5-cent blanks. The edge of the blanks was upset before stamping. The upset planchets were annealed in vacuum furnace.

TABLE 1

| Sample | C | Mn | P | S | Si |
|---|---|---|---|---|---|
| 1 | <0.02 | <0.3 | <0.03 | <0.001 | 0.2 |
| 2 | <0.02 | <0.3 | <0.03 | <0.001 | 0.4 |
| 3 | <0.02 | <0.3 | <0.03 | <0.001 | 0.8 |
| 4 | <0.02 | <0.3 | <0.03 | <0.001 | 1.6 |
| 5 (also included 0.7% Al) | <0.02 | <0.3 | <0.03 | <0.001 | 3.0 |

After annealing, the plastic strain generated during rolling was removed. The microstructure in the substrate had no orientation. The hardness of the samples is listed in Table 2.

TABLE 2

| | Silicon concentration | | | | |
|---|---|---|---|---|---|
| | 0.2 wt % | 0.4 wt % | 0.8 wt % | 1.6 wt % | 3.0 wt % |
| Hardness HRC 15T | 81.3 | 76.4 | 79.7 | 83.9 | 89.1 |

The EMS of the upset and annealed alloy blanks were measured with a coin validator (commercially of available under the trade name SCANCOIN ICP9, which is a coin validator used in banking industry to sort and count coins). The coin validator head more than 10 sensors to measure the conductivity, permeability, coin geometry size, and other properties at different frequencies. Four sensors measured the conductivity of the coins. For ferrous coins, the EMS readings do not have physical meanings but include a combination of physical properties detected by the eddy current sensor.

Figure 3:
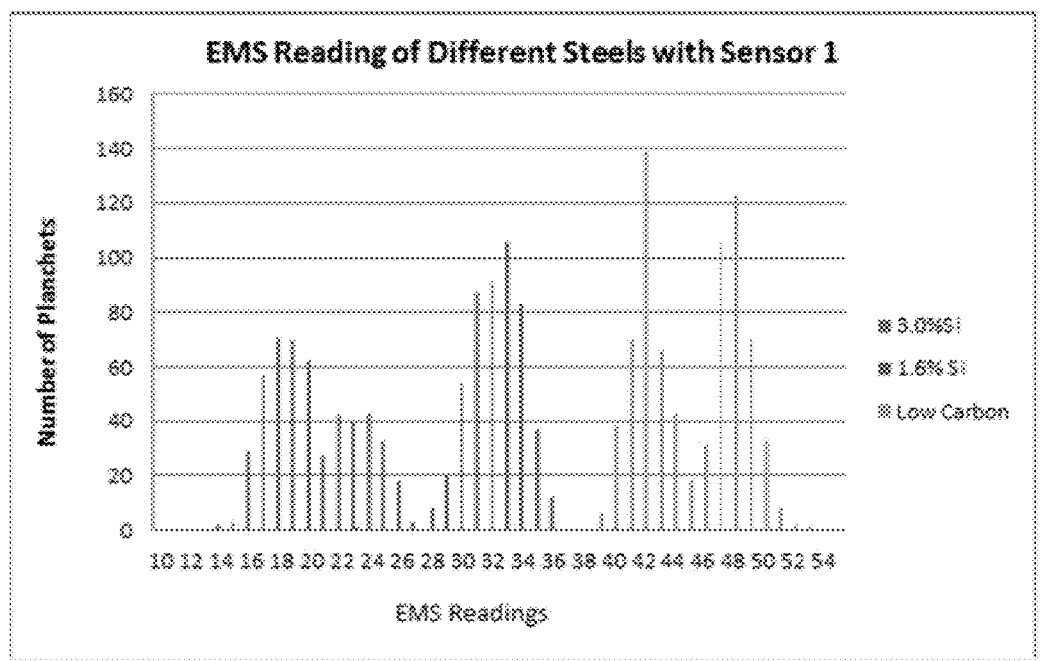
FIG. 3 shows a graph of number of planchents versus EMS readings.
Figure 4:
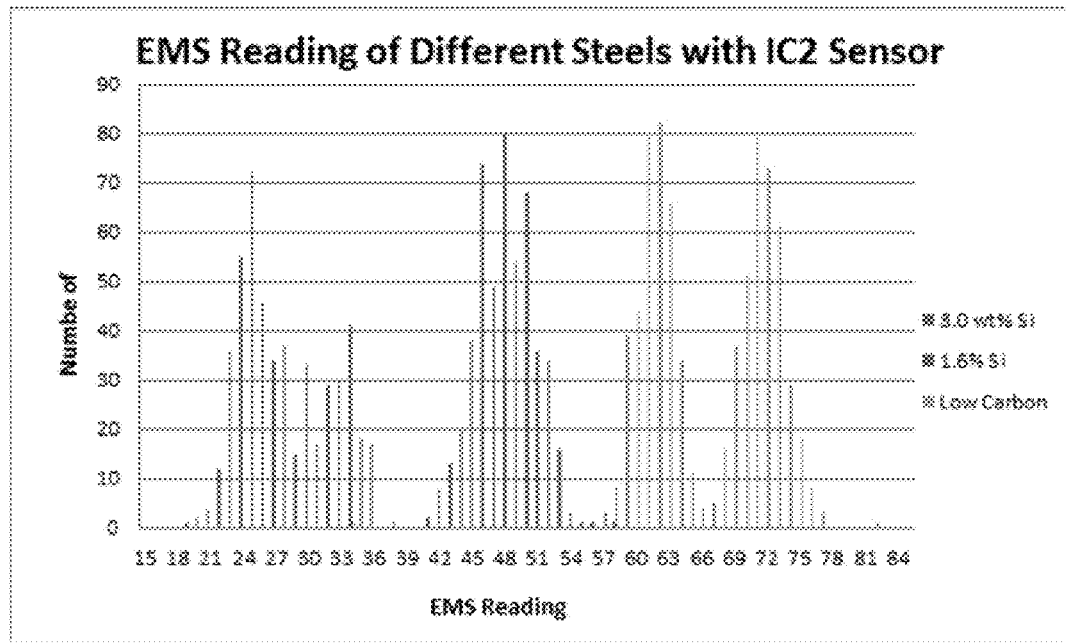
FIG. 4 shows a graph of number of planchents versus EMS readings.

The EMS digital readings from sensor 1 and sensor 2 were used to determine a difference between the silicon steel and low carbon steels. The EMS readings of different samples were plotted in a same histogram to compare the silicon effects on the impedance of the eddy current sensor in the circuit. The EMS readings measured by sensor 1 for low carbon steel, 1.6 wt % silicon steel, and 3.0 wt % silicon steel or shown in FIG. 3 (upset planchets before annealing.) The EMS histograms measured by IC2 of the SCANCOIN machine are shown in FIG. 4.

The EMS readings distributions of 0.2, 0.4 and 0.8 wt % of silicon steel are similar to the above samples. However, the distributions overlap each other. For a clear view, only low carbon steel, 1.6, and 3.0% of silicon steel also are shown in FIG. 4.

The average EMS readings of the five samples and low carbon steel measured by four eddy current sensors on ICP9 of SCANCOIN are listed in Table 3

TABLE 3

| Silicon concentration | 0.2 wt % | 0.4 wt % | 0.8 wt % | 1.6 wt % | 3.0 wt % | 0 wt % Low Carbon |
|---|---|---|---|---|---|---|
| Sensor 1 EMS Reading (Average) | 32.8 | 36.7 | 35.6 | 31.3 | 19.3 | 44.0 |
| Sensor2 EMS Reading (Average) | 48.5 | 54.8 | 53.0 | 47.1 | 27.1 | 65.7 |
| Sensor 3 EMS Reading (Average) | 51.0 | 51.4 | 50.6 | 48.9 | 45.4 | 53.7 |
| Sensor 4 EMS Reading (Average) | 77.6 | 79.2 | 77.8 | 75.4 | 69.0 | 82.3 |

Three of the five samples (0.4, 0.8, and 1.6 wt %) of the silicon steel planchets were annealed and then plated with a nickel protective layer. These three silicon steels were annealed at 1600° F. and soaked at that temperature for 30 minutes. After annealing, the conductivity changed. The annealed blanks were plated with 15 μm thick nickel surface layer. With this layer, the EMS readings of planchets changed again. The EMS readings of the three silicon steels from sensor 1 after each step are listed in Table 4. The EMS readings from sensor 2 are listed in Table 5.

TABLE 4

| | 0.4 wt % Si | 0.8 wt % Si | 1.6 wt % Si |
|---|---|---|---|
| After rolling | 36.7 | 35.6 | 31.3 |
| After annealing | 75.1 | 74.7 | 57.0 |
| After Ni plating | 77.4 | 78.7 | 61.5 |
| After stamping | 50.4 | 51.2 | 42.1 |

TABLE 5

| | 0.4 wt % Si | 0.8 wt % Si | 1.6 wt % Si |
|---|---|---|---|
| After rolling | 54.8 | 53.0 | 47.1 |
| After annealing | 88.4 | 82.9 | 61.7 |
| After Ni plating | 90.5 | 86.5 | 65.7 |
| After stamping | 60.9 | 59.6 | 48.2 |

Figure 5:
FIG. 5 shows a coin.

The nickel-plated planchets were stamped to coin as shown in FIG. 5.

Figure 6:
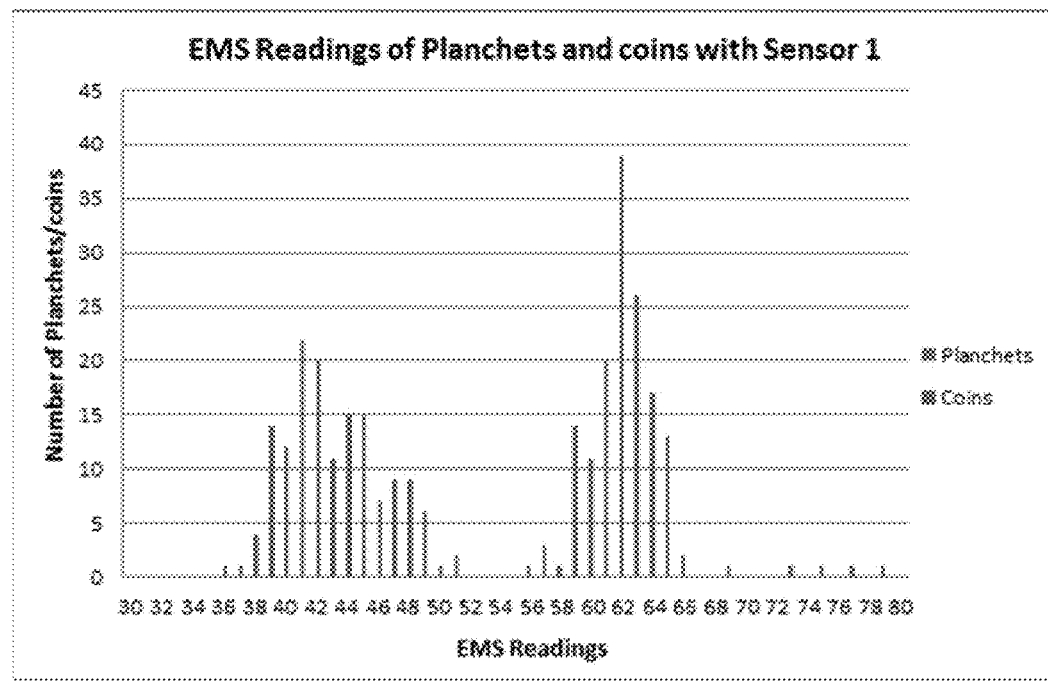
FIG. 6 shows a graph of number of planchents and coins versus EMS readings.
Figure 7:
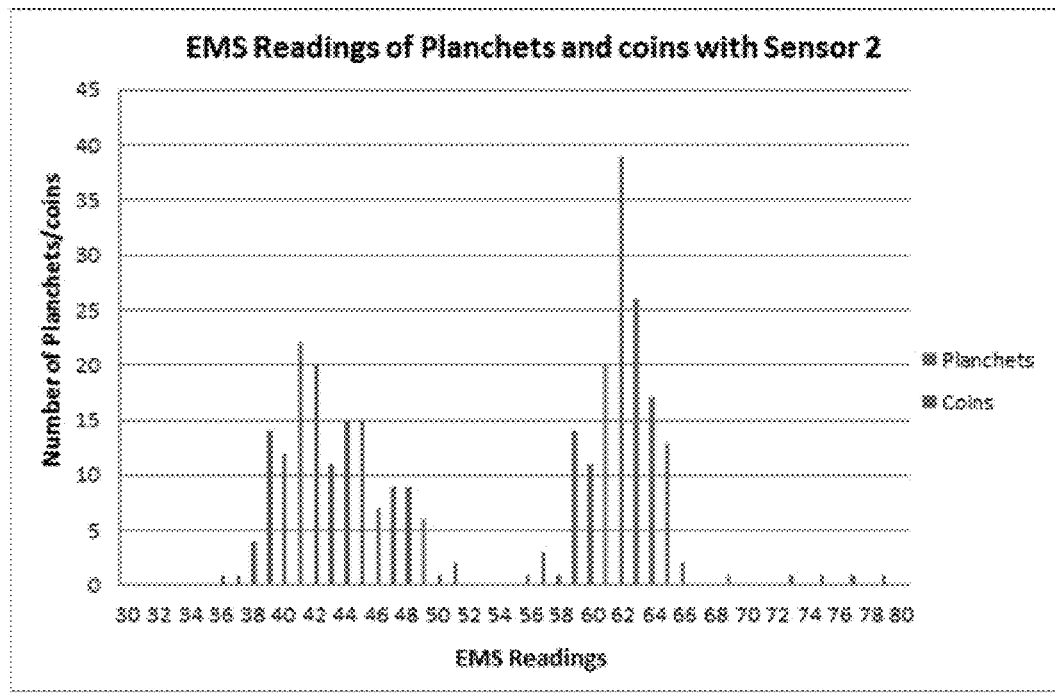
FIG. 7 shows a graph of number of planchents and coins versus EMS readings.

The EMS readings of planchets and coins made by nickel-plated silicon steel with the sensor 1 and sensor 2 in the ICP9 machine are respectively shown in FIG. 6 and FIG. 7. Due to the plastic deformation generated during stamping process, the EMS readings are further reduced.

According to the data in Table 4 and Table 5, the EMS readings may change at each step, such as annealing, plating, stamping, and the like. During the coinage production, once the parameters in each procedure are fixed on the production line, the final EMS measured by sensors on coin validators are distinct and consistent.

Figure 8:
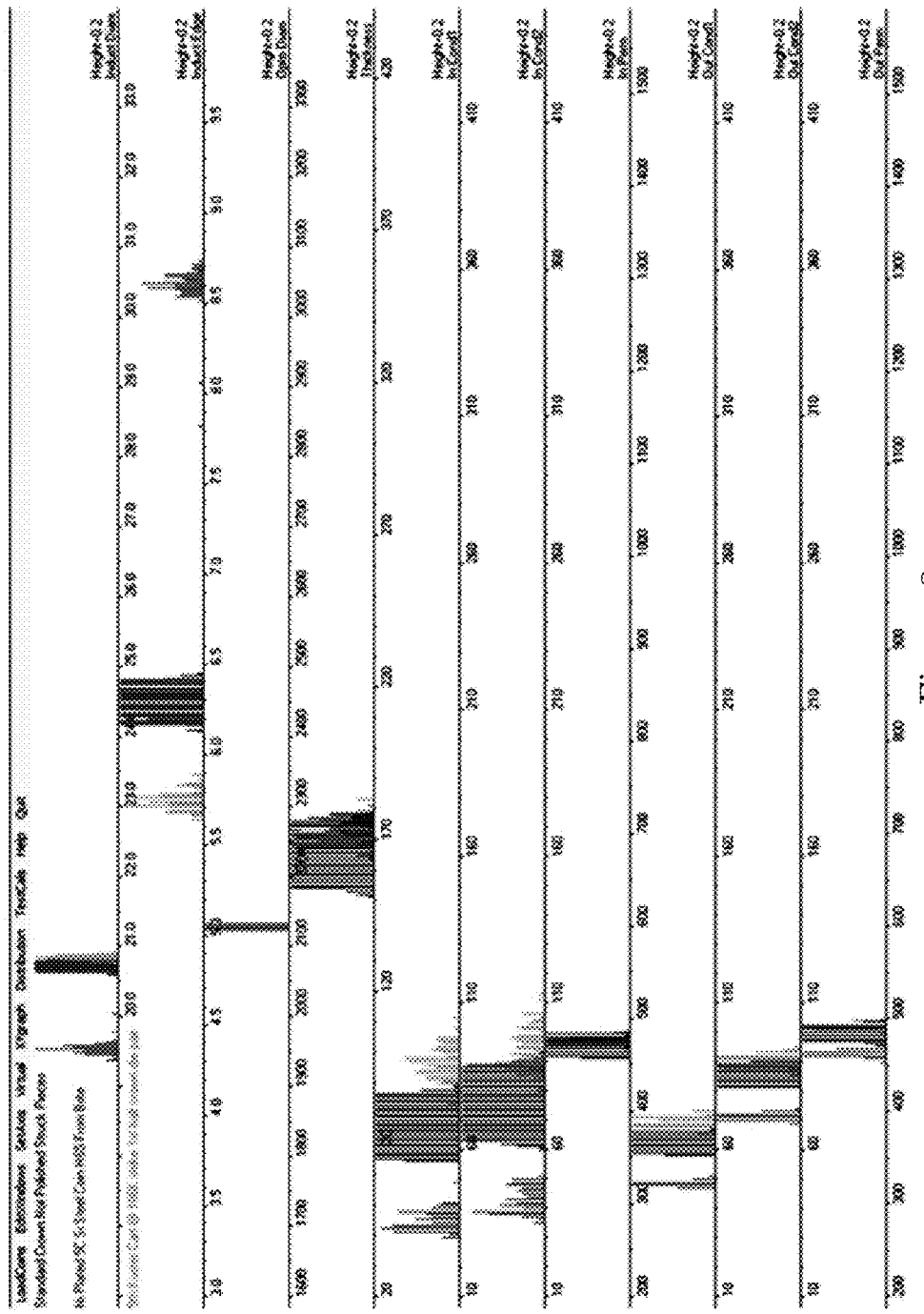
FIG. 8 shows histograms for various coins.

The measured EMS readings of all channels from the ICP9 are plotted in FIG. 8. The same size coins made of nickel-plated low carbons steel and multi-ply plated low carbon steel are measured with the same machine. The histograms of nickel-plated low carbon steel coins are plotted in blue color. The histograms of multi-ply-layer plated low carbon steel coins are plotted in green color. The histograms of nickel-plated silicon steel are plotted in red color. Although the nickel and multi-ply layer plated layers change the EMS reading a little at the surface, most inductive signal are still from the low carbon steel in the substrate. Therefore, the EMS readings of two coins made of low carbon steel overlapped each other. The EMS readings of all other nickel-plated steel coins are located at the same regions. For nickel-plated silicon steel, the EMS readings are shifted to low end to separate from them. The silicon steel coins can be easily distinguished from nickel-plated low carbon steel coins.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. An alloy comprising:
   steel;
   manganese present in an amount from 0.01 wt. % to 0.3 wt. %, based on a total weight of the alloy; and
   silicon in an amount such that the alloy has an electrical conductivity from 2% International Annealed Copper Standard (IACS) to 6% IACS measured in accordance with ASTM E1004-09 (2009).

2. The alloy of claim 1, wherein carbon is present in an amount from 0.001 wt. % to 0.02 wt. %, based on a total weight of the alloy.

3. The alloy of claim 1, wherein a relative permeability of the alloy is from 4000 to 40,000, based on a permeability of free space.

4. The alloy of claim 1, further comprising:
   carbon present in an amount from 0.001 wt. % to 0.02 wt. %, based on a total weight of the alloy,
   wherein:
      the silicon is present in an amount from 0.4 wt. % to 1.6 wt. %, based on a total weight of the alloy.

5. The alloy of claim 1, wherein the alloy is a fully annealed alloy.

6. A coin comprising the alloy of claim 1.

7. A composite comprising:
   an alloy core comprising the alloy of claim 1; and
   a plating disposed on the alloy core and comprising nickel.

8. The composite of claim 7, wherein the plating is completely disposed on the alloy core such that the alloy core is not exposed and is not visible through the plating.

9. The composite of claim 7, wherein the plating further comprises cupronickel, and the cupronickel comprises the nickel.

10. The composite of claim 9, wherein the atomic ratio of copper to nickel in the cupronickel is 75:25.

11. The composite of claim 7, wherein a relative permeability of the alloy is from 4000 to 40,000, based on a permeability of free space.

12. The composite of claim 7, wherein:
   carbon is present in an amount from 0.001 wt. % to 0.02 wt. %, based on a total weight of the alloy; and
   the silicon is present in an amount from 0.4 wt. % to 1.6 wt. %, based on a total weight of the alloy.

13. The composite of claim 7, wherein the alloy is a fully annealed alloy.

14. The composite of claim 7, wherein the composite is a coin.

* * * * *